United States Patent

Carmon

[19]

[11] Patent Number: 6,085,218
[45] Date of Patent: Jul. 4, 2000

[54] MONITORING PROCESSOR EXECUTION CYCLES TO PREVENT TASK OVERRUN IN MULTI-TASK, HARD, REAL-TIME SYSTEM

[75] Inventor: Donald Edward Carmon, Durham, N.C.

[73] Assignee: International Business Machines Corporation, Armonk, N.Y.

[21] Appl. No.: 08/274,655

[22] Filed: Jul. 13, 1994

Related U.S. Application Data

[63] Continuation of application No. 07/766,490, Sep. 26, 1991, abandoned.

[51] Int. Cl.[7] .................................................. G06F 13/00

[52] U.S. Cl. .......................... 709/107; 708/100; 709/101; 710/29; 710/260

[58] Field of Search .................................. 395/650, 550, 395/275, 375, 575; 708/100; 709/101, 107; 710/29, 260

[56] References Cited

U.S. PATENT DOCUMENTS

| | | | |
|---|---|---|---|
| 3,648,253 | 3/1972 | Mullery | 395/650 |
| 4,432,051 | 2/1984 | Bogaert | 395/550 |
| 4,954,948 | 9/1990 | Hira | 395/650 |
| 4,958,275 | 9/1990 | Yokouchi | 395/375 |
| 5,146,589 | 9/1992 | Peet | 395/575 |
| 5,193,189 | 3/1993 | Flood | 395/650 |
| 5,210,872 | 5/1993 | Ferguson | 395/650 |

*Primary Examiner*—Jean R. Homere
*Attorney, Agent, or Firm*—Steven B. Phillips

[57] ABSTRACT

Hard, real-time, multi-tasking system is monitored by combined hardware and software and logic to detect overrun of any task beyond a declared maximum processor cycle limit for the task. Processor execution cycles utilized by DMA or interrupt processing and not related to the task being executed are not counted. Counter hardware and control logic reduces software overhead for monitoring execution cycle utilization by a task and provides capability not only of overrun detection, but programmed cycle usage alarm, consumed cycle count and overall processor loading or utilization measurements to be made.

8 Claims, 4 Drawing Sheets

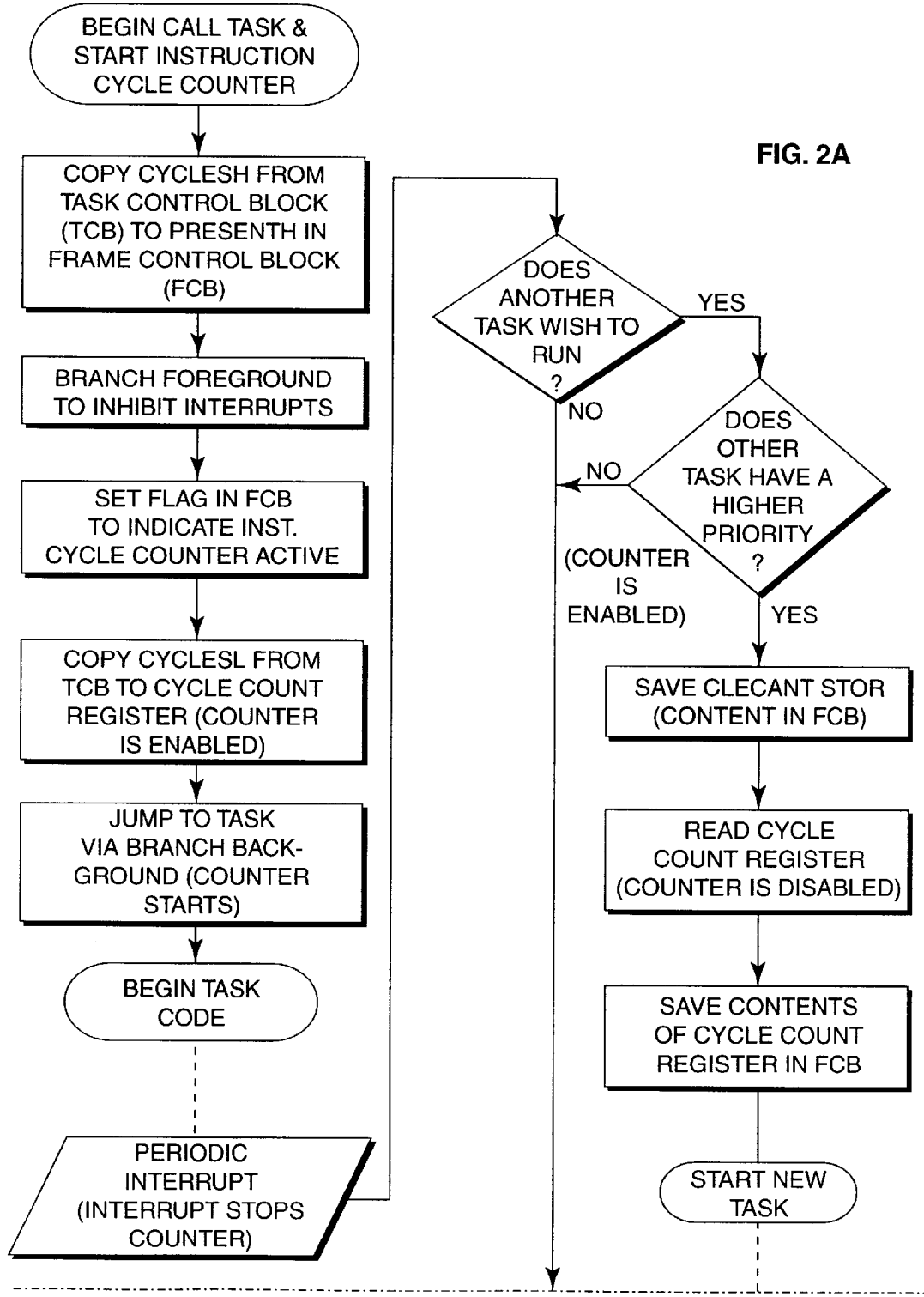

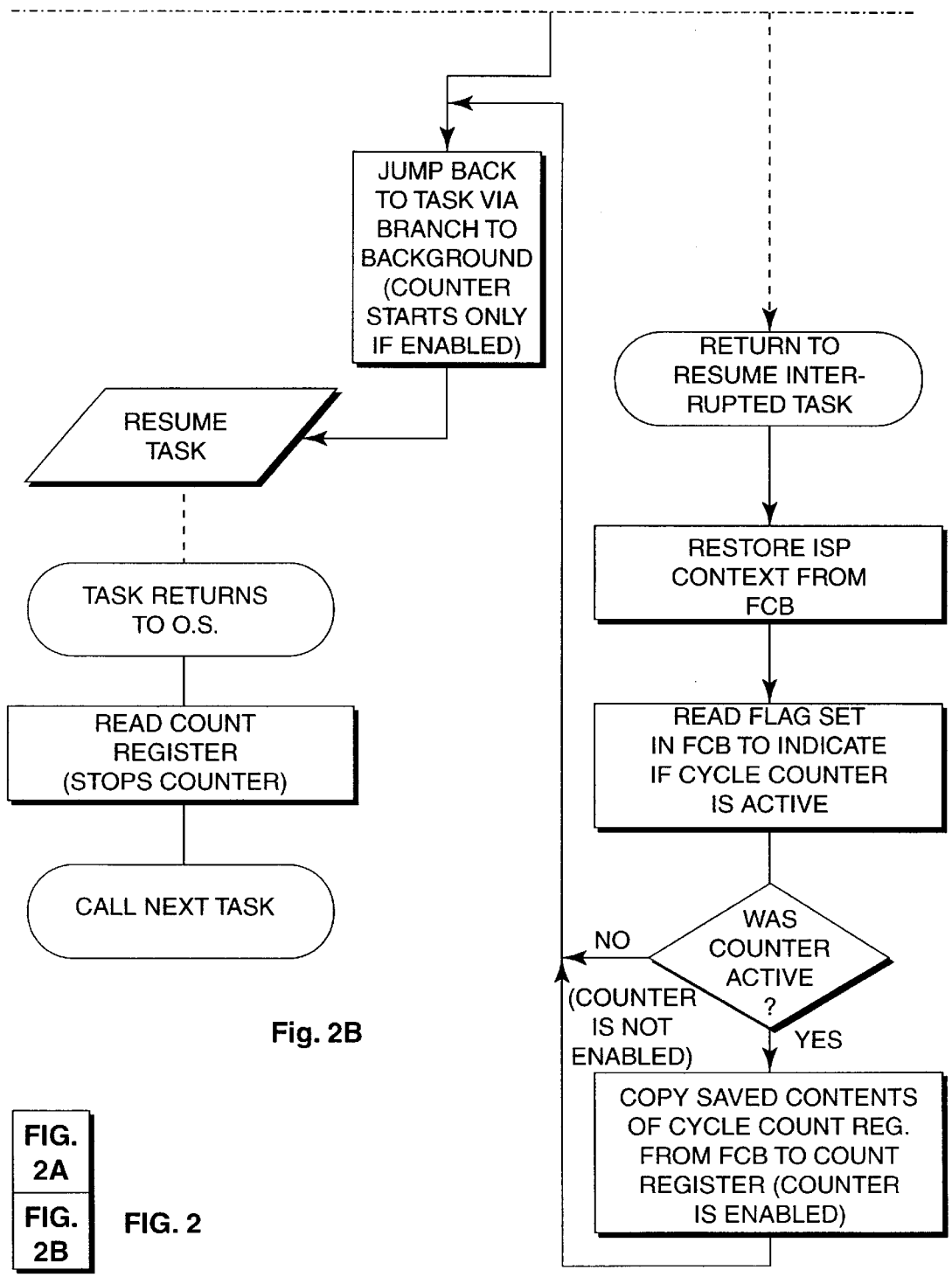

MONITORING PROCESSOR EXECUTION CYCLES TO PREVENT TASK OVERRUN IN MULTI-TASK, HARD, REAL-TIME SYSTEM

CROSS REFERENCE TO RELATED APPLICATION

This application is a continuation of application Ser. No. 07/766,490, filed Sep. 26, 1991, now abandoned.

FIELD OF THE INVENTION

This invention relates to multi-task computer systems in general and specifically to those which are required to provide task execution results in hard real-time such as tasks encountered in multi-media computer and display systems.

1. Prior Art

A great deal of study has been conducted in the field of scheduling algorithms for hard real-time systems. For example, reference may be had to Xu et al "Scheduling Processes with Release Times, Deadlines, Precedents and Exclusion Relations" appearing in the IEEE Transactions on Software Engineering, Vol. 16, No. 3, March 1990, pages 360–369 or to Rabbie et al "An Operating System for Real-Time ADA" appearing in the Journal of the ACM 1989, Vol. 10, pages 490–498 and to Halang et al "Methodologies for Meeting Hard Deadlines in Industrial Distributed Real-Time Systems" appearing in the IEEE Conference Proceeding in 1989, pages 567–573, to name but a few.

While this prior art is replete with numerous approaches to the scheduling problem which should permit multi-task hard real-time operation to proceed, little or nothing appears to have been done to prevent or control "crashes" in which a given task may overrun its execution time, thereby endangering other hard real-time tasks that are to be run and resulting in breakdown or failure of the computer system to meet the demands of the hard multi-task real-time environment.

A significant problem is that the program that actually fails because it did not meet its deadline may not have been the one that exceeded its maximum cycle usage. A latent problem with a task that has been implemented in a machine may not be uncovered until other tasks are loaded, perhaps years later, and an attempt is made to run them whereupon a breakdown occurs and no-one ever thinks to look at the fact that the originally installed program is the source of the problem. Additionally, it is possible that failure will only occur when the multi-task system is heavily loaded. The result is a situation in which a program or programs which violate the maximum cycle allocation may go undetected indefinitely until a new program introduced in the system uses sufficient processor resource to make the problem occur.

2. Objects of the Invention

In view of the foregoing known problems and deficiencies in the prior art, it is an object of this invention to provide an improved hardware and software implemented monitoring and control system for use in hard real-time multi-tasking computer systems that can accurately detect and limit utilization of the system by any task or group of tasks.

BRIEF SUMMARY OF INVENTION

In order to guarantee system integrity in a hard, real-time multi-tasking system, each real-time program task must be held to specify, in advance, the maximum number of processor cycles that it will use for each program execution. If any one of the individual programs running in the system consumes more processor cycles than allocated, it or some other program may not have sufficient time or processor cycles left to meet real-time deadlines. The solution is that, in a hard real-time system, actual task processor cycle usage must be allocated and managed and measured correctly. Just as robust, non-real-time multi-tasking systems need methods of keeping individual programs within their allocated memory boundaries, a hard real-time multi-tasking system needs a method of keeping the program within the processor usage allocation. Complicating this problem is the fact that a given task or program does not necessarily execute in a contiguous time block. A particular program's execution period may be interrupted by a system interrupt handling routine or a higher priority program interrupt. To accurately insure that a task itself does not exceed its own maximum processor cycle allocation, a mechanism and process have been provided which accurately counts only the processor cycle used by each individual program. A counter is implemented with logic that prevent advancing the counter when DMA or interrupts occur. A hybrid system in which hardware logic and counters are implemented in the processor and a management routine having minimum overhead is run in order to keep track of consumed machine cycles for each task provides the solution.

The cycle counter is a 16-bit count register, such as a 16-bit decrementing counter, and necessary control logic to operate the counter in one of three states: the counter itself may be disabled and stopped or enabled and stopped or enabled and running. The logic assures that the cycle counter may not directly change from the state of being disabled and stopped to the state of being enabled and running. Thus, actual counting is controlled by the occurrence of actual execution cycles for a task. The software portion of the mechanism loads the cycle count registers, keeps track of cycles used and cycles remaining in the case of an interrupt, monitors the decrementing counter to detect overrun and manages saving and restoring of the remaining contents in a count register if a higher priority task or interrupt occurs. The software prevents any individual task program from exceeding its declared and specified maximum cycle count consumption during execution. Several register values are maintained by the software including a count of the program's allocated maximum execution cycles that have been allocated and a count of actual usage whenever the program has been preempted by a higher priority program.

BRIEF DESCRIPTION OF DRAWINGS

The foregoing and still other objects of the invention not specifically enumerated, have been met in a preferred embodiment incorporating hardware circuitry and logic and software monitoring of the state of the logic and controls which are further described and illustrated with reference to a preferred embodiment as shown in the drawings in which:

FIG. 2 illustrates the process flow chart of a preferred embodiment of the software portion of the invention for the condition in which another task interrupts operation of a first task during its execution.

DETAILED DESCRIPTION OF PREFERRED EMBODIMENT

It is assumed at the outset that familiarity with hard real-time processor systems on the part of the person of ordinary skill in this art exists as evidenced by some of the journal papers and references cited above in the prior art section. The invention herein presumes that each task in a multi-tasking system will be held to the requirement of declaring its own maximum execution cycle count limit that will be required by the task running to completion. The present invention will accurately count only processor cycles used by each individual task or program during its execution and will not count those machine cycles during the execution time of a task within which code is not actually being executed. For example, machine cycles stolen for DMA or memory refresh purposes or due to interruption of the task by a higher priority task to be executed will not be counted.

The hardware portion of the invention is centered around a 16-bit register and decrementing counter. The hardware also includes the necessary control logic to operate the decrementing counter, read and write contents of the 16-bit register, detect overrun conditions and generally operate the counter in any of three logical states defined as "disabled and stopped", "enabled and stopped" or "enabled and running".

Figure 1:
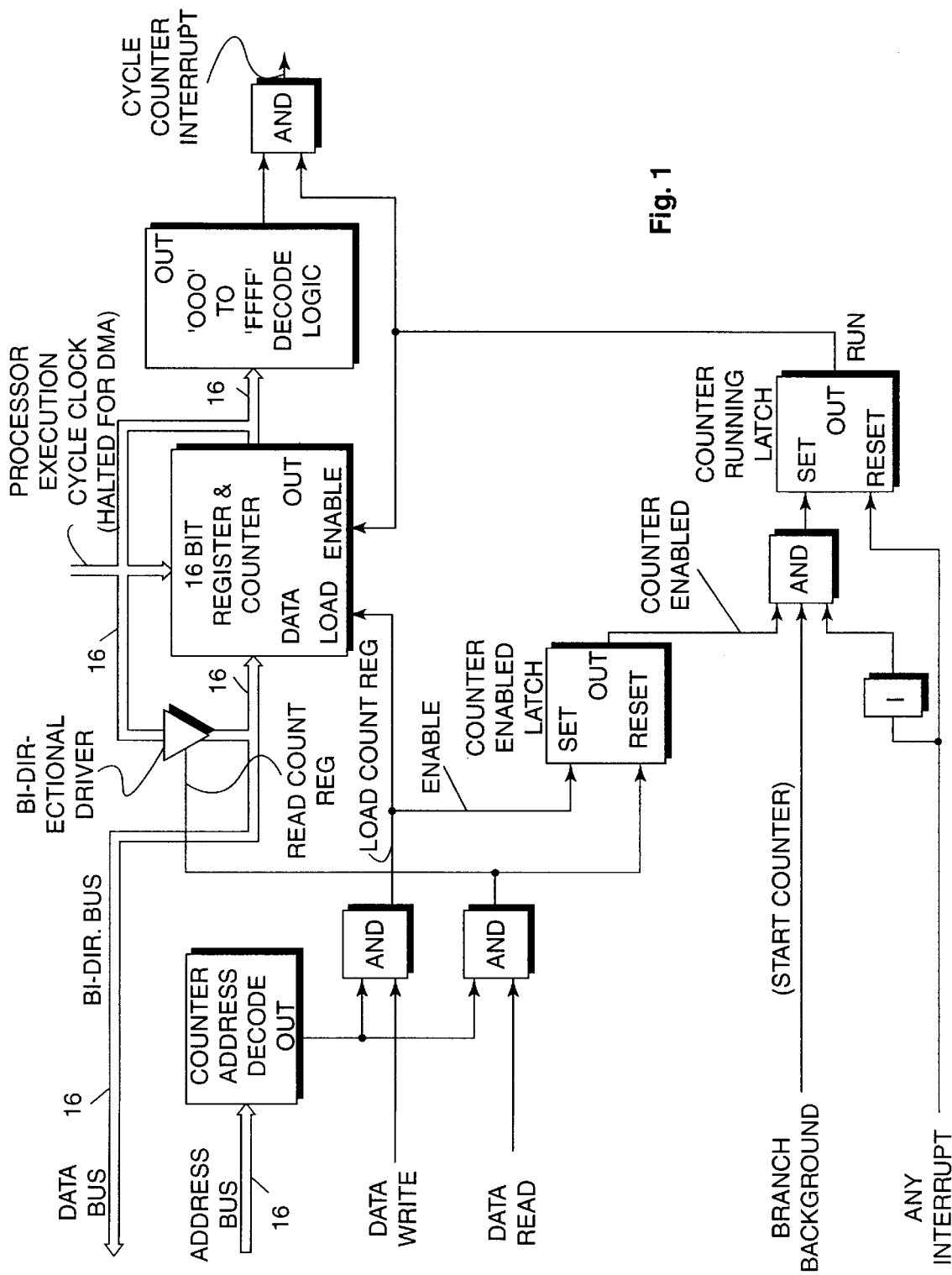
FIG. 1 illustrates schematically the hardware logic and decrementing counter for the hardware portion of the preferred embodiment.

Turning to FIG. 1, the initial register contents for counter register 1 are provided over a 16-bit bus 2. Bus 2 is bidirectional and is the databus in a typical multi-processor system. The register in counter 1 is provided with execution clock cycle pulses from the processor circuitry over line 3. Normally, each processor execution clock pulse is utilized to decrement the present content of the 16-bit register counter 1 when the counter is enabled and running. If the counter should "roll over" to (hexadecimal) "FFFF" this fact will be detected in decode logic 4 and, in the event that the counter 1 is enabled and running, and gate 5 will present a cycle counter interrupt to the software system portion of the invention as a detection of an error condition, i.e. an overrun will have been detected.

Operation of the hardware in FIG. 1 includes initially decoding the counter address appearing on bus 6. This is the address bus in the processor system. Decoding occurs in the counter address decoder 7 preparatory to loading the contents of the databus 2 into the register counter 1. When the counter's address is found on bus 6, the address decoder 7 enables AND gates 8 and 9. This causes, in the presence of a data write strobe on line 10 or a data read strobe on line 11, appropriate enabling to cause loading of the present contents of the databus 2 into register 1 over the line the 12, "enable load count register". This gates the contents of bus 2 into register 1. A "read" of the present contents from the output 13 of the register counter 1 via the bidirectional driver 14 gates the contents from register 1 back onto the databus 2 during reading as controlled by AND gate 9 and the data read strobe 11.

Additional logic is incorporated as shown in FIG. 1 to control the state of the register counter 1. Latch 15 is set upon writing of data into the counter and energizes the counter enabled output 16. Output 16 is reset over line 17 in the event of a reading of the count register. If the enabled output 16 is present, no interrupt is present and any processor branch to background state occurs, (the condition necessary to begin execution of a task), AND gate 18 will be fully enabled and latch 19 will be set to enable and run counter register 1. If a branch to foreground should occur (the opposite of branch to background) latch 18 would be disabled as would be the case if any interrupt or clock halt occurred. This, through inverter 20, would disable AND gate 18 and also reset Latch 19 to stop counter register 1. The branch to background control line 21 and the interrupt control line 22 supply the necessary signals to AND gate 18 as shown.

Operation of the logic and hardware in FIG. 1 is such that the cycle counter 1 cannot directly change from the state of being disabled and stopped to the state of being enabled and running. This is because the branch to background and lack of interrupt conditions must also both be satisfied as stated above. Cycle counter register 1, as mentioned previously, counts execution cycles when it is enabled to run and causes decrementing of the count initially loaded into it from the databus 2. The cycle counter is stopped if a read is conducted on the register contents of counter 1. Writing a new load to the counter register enables but does not start the counter operating. Any branch of the system processor to background mode starts the cycle register 1 counting provided that it has not been disabled by some other condition. And any interrupt appearing on line 22 will stop the cycle counter without disabling it.

These provisions enable the hardware to be controlled to count only execution cycles elapsed while a task is actually being executed. When the cycle counter register 1 is enabled and running, the count register within it is decremented by one count with each machine execution cycle as strobed over line 3 by the processor cycle clock, not shown. If the processor is halted for any reason, such as to allow DMA access to the processor's memory, cycle count register 1 is not decremented because the processor cycle clock, line 3, does not strobe when the processor is halted. Therefore, only processor cycles in which task code is actually executed are counted. If a count eventually causes "rollover" from all zeros to FFFF in hexadecimal, the cycle counter hardware 1, through the decode logic 4 and AND gate 5, will cause an interrupt to the execution processor system which is handled as will be seen in the software portion of the invention. A transition from 0 to FFFF which is caused by a writing to the counting register will not cause an interrupt.

Figure 3:
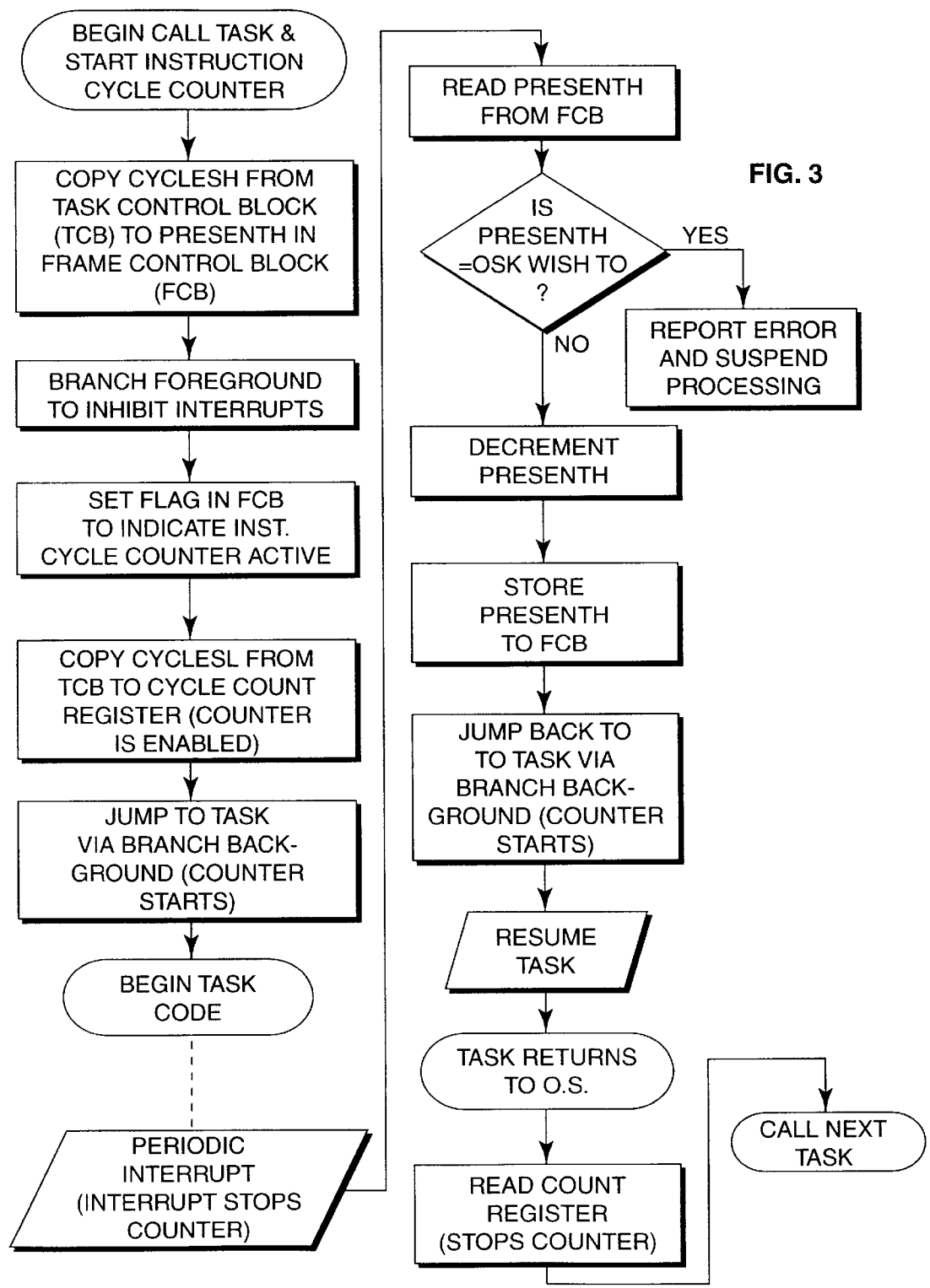
FIG. 3 illustrates the software flow chart for detection and management during execution of an overrunning task.

The software portion of the preferred embodiment is shown in FIGS. 2 and 3 and will be described briefly herein. In the embodiment shown, software register contents for a full 32-bit of cycle count are provided and, since the machine does not implement a 32-bit counter as shown in FIG. 1, the total cycle count is divided into two 16-bit groups with the low order bits and the high order bits each representing 16 bits. Software registers for "CYCLESL" store the low 16-bits of the program's or task's maximum allocated cycle count and "CYCLESH" contains the highest order 16-bits of the program's maximum allocated cycle count. "PRESENTH" holds the present high 16-bits of the cycle count reached by the counter 1 in FIG. 1. The operation of the system is controlled so that when the operating system for the processor calls a task or program for execution, the content of CYCLESL is copied into the count register 1 and the contents of CYCLESH is copied into the software register for PRESENTH. Therefore the combination of the registers in software and hardware, PRESENTH and the count register 1, hold the maximum number of allocated processor cycles for a given task or program that has been called at this time. While the task executes, count register 1 is decremented at each execution cycle of the processor. If the program is preempted by a higher priority task, the current state of the count register 1 is stored away and saved so that it may be restored when execution of the preempted program is again resumed. If the count register 1 should be decremented to rollover from all zeros to FFFF in hexadecimal, an interrupt condition occurs which transfers program control back to the operating system as a potential "error" has been detected in the form of an overrun. The operating system will examine the contents of its software register PRESENTH. If the content is not 0, the content of PRESENTH will be decremented by 1 and control returned again to the interrupted program with the count register again decrementing from FFFF. If the cycle counter 1 causes an interrupt and PRESENTH is found to be 0, then the program will have exceeded its maximum cycle count and an appropriate error reporting and recovery action can be taken.

Additional functions can be implemented with this same hardware and software which are of great utility in these systems. A cycle alarm service can be implemented, for example, for use by a given task or program which by its own nature may consume some indeterminate number of processor cycles. For example, a program might call a function that uses an iterative process to converge upon a desired solution or some other iterative algorithm process. Perhaps the iterative process would converge at different rates as a function of its input data. Furthermore, after some determined number of iterations it may be acceptable to consider whatever solution the algorithm has reached to be close enough to the desired result to take some alternative action. In any of these cases, a cycle alarm service can be implemented by periodically reading the content or by presetting the cycle counter 1 to the requested number of cycles before an alarm is created. A program may have a certain allocation of machine cycles and a requested alarm condition for a lesser number of cycles, i.e. it might be determined that having achieved the requisite minimum number of cycles that a solution of sufficient precision is available. A cycle alarm service routine can set the cycle counter 1 equal to the requested alarm cycle limit and put any remainder of allocated cycles into a reserve location, thereby enabling a report to the user program of the number of cycles that it still has in reserve at any time. If the cycle counter 1 should reach 0 before the task completes or requests additional alarm cycles, the program can be interrupted and any reserve cycles put into the cycle counter 1 to resume execution.

A cycle count service can also be implemented to be used by a programmer task to inquire how many processor cycles it has left at any given time. This service would simply read the current state of cycle counter 1 and return the information to the requesting program. The logic in FIG. 1 enables reading data from register 1, during which time the counter will be disabled by the logic.

A processor usage monitor may also be created utilizing the same system to determine the degree of loading in the processor system. If the number of cycles each program or task uses during each execution period is known, an accurate measure of the system processor usage can be easily calculated. To accomplish this, each time a task returns to the operating system, the processor usage monitor program can read the current state of the cycle counter, subtract it from that program's total cycle allocation and determine the actual processor usage utilized by each task. These may be averaged with other task's actual count or usage over time to gain an average processor usage figure.

Returning to the preferred embodiment, in FIG. 2, the process flow begins with Box 23 when a given task is called by the processor's operating system to begin execution. This starts the instruction cycle counter and preparation flow in Box 23. In Box 24, the operating system is required to copy the "CYCLESH" content from the task's control block and memory into the PRESENTH field or register in its frame control block in memory. This is followed by initiating a branch to foreground in the operating system control of the processor as shown in Block 25. This inhibits interrupts from occurring during critical operations that follow in Boxes 26 and 27. In Box 26, a flag is set in the frame control block in the processor's memory to indicate that the instruction cycle counter 1 of FIG. 1 is now active. In Box 27, CYCLESL is copied from the task control block in memory into the cycle count register 1 of FIG. 1 and counter 1 is then fully enabled but for a starting signal. The starting signal comes in box 28 by executing a branch to background condition which simultaneously allows the occurrence of interrupts, should any occur, and enables AND gate 18 in FIG. 1 to enable counting in count register 1. The task code begins execution in box 29 and runs until a hypothetical interrupt, that may occur periodically from a variety of sources, occurs. This stops the counter as shown in box 30. A question is asked in box 31 as to whether another task is to be run and if the answer is "yes", the priority of the task is checked in box 32 to determine if it is higher than the task which is executing. If no other task wishes to run or if the interrupting task has a lower priority than the task which is executing, the system proceeds to box 33 to resume the task which was interrupted by branching back to "background", whereupon counter 1 will resume operation as shown in box 34 until the task completes in block 35 by returning to the operating system of the processor. A reading of the contents of the count register 1 occurs next as conducted by the operating system to stop and disable the counter and for any of the record keeping purposes noted above. This is shown in block 36 and in block 37 where the operating system calls the next task in the multi-tasking system for operation.

Returning to block 32, if the interrupting task does have higher priority, processor's state is saved and stored in the task's frame control block in memory as shown in block 38. This involves reading the cycle count from register 1 in FIG. 1. This will result in disabling the counter as shown in block 39 and the counter's contents will be placed on the databus 2 for loading into the task's frame control block in memory as shown in block 40. A new task may then be initiated in block 41 following similar steps to those conducted in blocks 23 through 29. This new task will run until it is interrupted, ends or overruns and a return to the interrupted task is finally directed by the operating system as shown in block 42. In block 43, the processor's state is restored to its state prior to being preempted by the higher priority task. Note: The "active flag" is used to accommodate tasks which do not use the cycle counter, for example, non-real-time tasks do not use the cycle counter, so a means is required to not enable the counter when restoring an interrupted task. In block 44, a check is conducted to determine if the cycle counter was active when the task was preempted. In block 45, if the counter was not active, the procedure continues to jump back to the task via a branch to background. If the counter was active in block 45, block 46 causes writing of the contents of cycle count register saved in the FCB back to register 1 and the counter is enabled and flow continues to block 33 as shown.

FIG. 2 thus describes the general operation of loading the counter, interrupting a task during execution, saving the contents of the counter in the task's frame control block, initiating a new task and running to completion or to interruption as described. FIG. 3 illustrates the general condition, operative also in FIG. 2, but in which a task runs sufficiently to cause the count register to roll over to all F's. In FIG. 3, blocks 23 through 29 are the same as those as described with reference to FIG. 2 involved in the start-up of any task with the loading of cycle count and the initialization of the frame control block so these will not be repeated here.

In FIG. 3, an executing task with an active cycle counter will eventually cause the content of the cycle counter to roll over as shown in block 47. This will initiate a reading of the PRESENTH content from the FCB in memory in block 48 and a check in block 49 for a zero condition remaining in the PRESENTH value. If zero is found, block 50 reports an error condition to the operating system indicative of the fact that the task has overrun its allocated maximum number of machine cycles because all of the counter content 1 has been decremented and no further counts remain in PRESENTH to be utilized. If, however, PRESENTH is not zero, block 51 decrements the PRESENTH count by 1, restores in block 52 the new value of PRESENTH to the frame control block, and moves to block 53 to resume a branch to background to restart the counter. Then the task that was operating and being executed is resumed in block 54 and it either runs to completion, as shown in blocks 35 through 37, or it causes the register to roll over again, causing a repeat of the flow from box 47 through 53 as just described.

As a specific example, let us assume that the system processor has an instruction cycle execution time of 100 nanoseconds, equivalent to a processor capable of executing 10 million instructions per second. Let us further presume that a given task has been allocated or has declared that its maximum usage will consume 100,000 processor cycles and that an execution period at which the task requires the absolute hard results is 20 milliseconds. This places a demand on the processor system equal to five million instructions per second. It may be seen that the task lies within the capability of the processor system.

The task control block, TCB, for the task will contain, among other things, that task's declared cycle count allocation of 100,000 machine execution cycles, plus two. The two additional cycles are necessary to permit the processor to stop the cycle counter when the task returns to the operating system. The count as implemented above is actually a 32-bit count with the upper and lower 16 bits being held in locations referred to as CYCLESH and CYCLESL, respectively. The frame control block, FCB, for the task with the 20 millisecond execution period demand contains, among other things, locations in memory where the upper and lower 16 bits of the 32-bit count will be stored. The locations are referred to as PRESENTH and SCYCLCNT, respectively.

Given these assumptions, the instruction cycle counter in FIG. 1 operates in the following manner in conjunction with the software shown in FIGS. 2 and/or 3. In preparation for calling a task, the operating system executes steps 23 through 29 in FIG. 2 or 3 in which it copies CYCLESH from the TCB into the location of PRESENTH specified in the FCB. It inhibits any interrupts by entering "foreground" mode in the processor so that the cycle counter 1 can be set up and the task can begin without interruption from any other tasks or sources. It sets a flag in the FCB to indicate that the cycle counter is then active and monitoring operation or execution of the task. Finally it copies CYCLESL from the TCB into the count register 1.

At this point, the hardware in FIG. 1 is enabled, but the counter will not be running. The counter 1 will not be decrementing because the branch to background has not yet occurred. The PRESENTH location in memory holds the value 0001 in hexadecimal and the count register 1 will hold the value 86A2 in hexadecimal. That is, taken together, the contents of PRESENTH and the contents of the count register 1 together hold 32-bit hexadecimal representation for the total allocation of 100,002 cycles. The counter will begin decrementing when the interrupt protection, the branch to foreground, is dropped and the task is called to execute. To do this, the operating system executes a branch to the background mode within the processor with the branch target being the task's first instruction location. The task will then begin to execute and counter 1 will decrement by 1 for each execution cycle in which the task is actually executing. Individual cycles that may be stolen from the task operation for DMA activities or any other reason will not be counted since the counter will be stopped by the stopping of the processor execution cycle clock which occurs to permit such actions. Under normal operation, the counter will continue decrementing until it rolls over from all zeros to all F's in hexadecimal. This will cause the instruction cycle counter interrupt from decode 4 and AND gate 5 as shown in FIG. 1. This will temporarily stop the count register 1 from decrementing and cause program execution to be redirected to the instruction cycle counter interrupt handling code. This code will examine the contents of PRESENTH in the FCB as shown in blocks 48 through 53 in FIG. 3. If PRESENTH has been decremented all the way to zero, the task has completely exhausted its allocated count and the appropriate error handling procedure would be invoked. In the present example, PRESENTH holds the value 0001 hexadecimal, thereby indicating that there are still 65,536 cycles remaining allocated to the task. Since the value held in PRESENTH is not zero, it will be decremented by one (thereby going to all zero), and control will be returned to the task to be executed. A branch back to the task is accomplished by a branch to background which will restart the count register to resume decrementing from all F.

In the case of an interrupt, we may suppose that the first task is executing and that the interrupt as shown in FIG. 1 stops the count register 1 from decrementing while control is redirected to the particular interrupt code handling segment. We may suppose also that the interrupt code determines that another higher priority task needs to run as shown in blocks 31 through 46 in FIG. 2. In this case, the contents of the count register 1 will be moved to the SCYCLCNT location in the FCB as shown in block 40 of FIG. 2. The combination of PRESENTH and SCYCLCNT now together hold the current 32-bit count value and the higher priority task can then be called by the operating system. When the higher priority task has run to completion, or interruption by a still higher priority task, etc., it will be time to resume either the interrupt task or a higher priority task. Assuming that one is returning to an interrupted task due to completion of the higher priority interrupting task, the return to the interrupted task is accomplished as shown. A branch back to the task which was interrupted causes the counting register to resume decrementing as the branch to background enables counting to resume. Count register 1 will continue decrementing until the task returns to the O.S. and the O.S. performs a read of the counting register. This both stops and disables the register. At this point, the combination of the contents of PRESENTH and the count register 1 holds the number of cycles remaining from that task's declared maximum cycle count. If desired, as stated previously above, the actual number of cycles used by the task could be calculated by subtracting any remaining cycles from the task's declared maximum count.

The utilization of the hardware circuit in FIG. 1 in conjunction with the software routines of FIGS. 2 and 3 drastically reduces the overhead that would be placed upon the operating system and processor in order to implement all of the counting and logic functions in a monitoring program. Furthermore, since any monitoring program implementing all of these functions would require a number of machine cycles to be run after each and every task execution, the overhead would be prohibitive. The inclusion of the hardware in addition to the minimal software routine which is only invoked at interrupts, etc. is a unique solution. With suitable control logic as shown, this solution permits truly accurate measuring of utilization of a task during its actual execution only. The problem of overruns in multi-tasking systems of any sort is a significant one. The theoretical solutions today are approximate only because the mechanism of the present invention has not been available. The invention is independent of the specific operating system or processor family, and while it may be utilized to great advantage in multi-tasking hard, real-time environments such as those occurring in signal processors in multi-media applications, it is also equally applicable to mainframe computer operating systems in multi-task mode and to a variety of smaller systems as well whenever accurate measuring of processor utilization, detection of task overrun, etc. is desired. Therefore, while the invention has been described above with reference to a preferred embodiment thereof, what is desired to be protected by letters patent and what is set forth in the claims is indicated by way of example only and not of limitation, wherefore what is claimed is:

What is claimed is:

1. In a multi-tasking program execution system, a method of monitoring task overrun conditions, the method comprising the steps of:

counting only processor execution cycles associated with a specific task occurring while said specific task is executed, said specific task being executed together with one or more other tasks by a single processor; and generating a cycle counter interrupt which is one type of processor execution interrupt whenever said counting reaches a predetermined value; and stopping said counting whenever any processor execution interrupt occurs.

2. A method as described in claim 1, further comprising:

resuming said counting whenever a processor resumption of execution of said specific task occurs because said counting was stopped for a processor execution interrupt other than a cycle counter interrupt which is one type of processor execution interrupt.

3. A method as described in claim 1 or claim 2, further comprising the steps of:

examining said processor execution interrupt to determine whether it is for one of said one or more other tasks which has a priority which is higher than the priority of said specific task; and storing the count reached in said counting if said processor execution interrupt is for one of said one or more other tasks which has a priority which is higher than the priority of said specific task; and resuming said counting if said processor execution interrupt is not for one of said one or more other tasks which has a priority which is higher than the priority of said specific task.

4. A method as described in claim 1 or claim 2, further comprising the steps of:

establishing for each specific task a processor execution cycle count limit;

comparing said processor execution cycle count limit to a count obtained and stored in a counter while counting said processor execution cycles associated with said specific task occurring while said task is executed; and if said processor execution cycle count limit has not been reached, continuing said counting but terminating execution of said specific task if said processor execution cycle count limit has been reached.

5. In a multi-tasking program execution system, a method of monitoring and controlling task execution cycle overrun, comprising the steps of:

establishing a processor cycle count limit for each specific task to be executed;

enabling a counter and writing said cycle count limit into said counter;

counting processor execution cycles associated with a specific task while said specific task is being executed in a single processor, said specific task being executed together with one or more other tasks by said single processor;

disabling said counter, stopping said counting, and generating a cycle counter interrupt which is one type of processor execution interrupt whenever said processor cycle count limit is read from said counter indicating said processor cycle count limit has been reached;

stopping said counting but not disabling said counter whenever said execution system receives a processor execution interrupt which is not a cycle counter interrupt; and starting said counting whenever said execution system begins execution of said specific task.

6. Apparatus for detecting task execution cycle overrun in a multi-tasking processor system, comprising:

counting means for counting processor execution cycles associated with a specific task, said specific task being executed together with one or more other tasks by a single processor; logic means connected to said counting means to control said counting means said logic means comprising:

means for enabling said counting means;

means for disabling said counting means when a cycle counter interrupt which is one type of processor execution interrupt occurs;

means for starting said counting means whenever said multi-tasking processor system begins execution of said specific task and said counting means is not disabled; and means for stopping said counting means but not disabling said counting means whenever a processor execution interrupt which is not a cycle counter interrupt occurs.

7. Apparatus as described in claim 6, further comprising:

means for generating said cycle counter interrupt whenever said counting means reaches a predetermined value.

8. Apparatus for monitoring execution task overrun conditions in a multi-tasking program execution system, the apparatus comprising:

means for counting only processor execution cycles associated with a specific task occurring while said specific task is executed, said specific task being executed together with one or more other tasks by a single processor;

means for generating a cycle counter interrupt which is one type of processor execution interrupt whenever said counting means reaches a predetermined value; and means for stopping said counting means whenever any processor execution interrupt occurs.

* * * * *